United States Patent [19]

Albrecht et al.

[11] 4,183,572
[45] Jan. 15, 1980

[54] RAILWAY FLANGED WHEEL VIBRATION DAMPENING ASSEMBLY

[75] Inventors: Helmut Albrecht, Miesbach; Oskar Bschorr, Munich; Helmut Hassel, Genderkingen, all of Fed. Rep. of Germany

[73] Assignee: Messerschmitt-Bolkow-Blohm GmbH, Munich, Fed. Rep. of Germany

[21] Appl. No.: 850,368

[22] Filed: Nov. 10, 1977

[30] Foreign Application Priority Data

Nov. 20, 1976 [DE] Fed. Rep. of Germany ....... 2652874

[51] Int. Cl.² .................. B60B 7/04; B60B 17/00; B60B 19/00; F16H 55/14
[52] U.S. Cl. .................................. 295/7; 74/443; 105/452; 181/207; 188/1 B; 188/218 A; 295/15; 295/19; 295/20; 301/6 WB
[58] Field of Search ............. 295/7, 21, 6, 15, 18, 295/19, 20, 25; 74/443; 105/452; 181/166, 207, 208, 209; 188/1 B, 218 A; 301/6 WB

[56] References Cited

U.S. PATENT DOCUMENTS

| 1,880,953 | 10/1932 | Fageol | 105/452 X |
| 2,129,178 | 9/1938 | Jordan | 295/7 |
| 2,285,924 | 6/1942 | Halfvarson | 181/208 |
| 2,293,181 | 8/1942 | Terman | 181/166 |
| 2,605,132 | 7/1952 | Watter | 295/7 |

FOREIGN PATENT DOCUMENTS

| 2229420 | 6/1972 | Fed. Rep. of Germany | 181/208 |
| 550761 | 1/1943 | United Kingdom | 181/208 |

OTHER PUBLICATIONS

Kurel, Ernst-Gunther, MaBnahmen zur Schalldampfung an Schienenfahrzeugradern und Schienen; 24 Nov. 1975, Eisenbahntechnische Rundschau, pp. 405–409.

Primary Examiner—Trygve M. Blix
Assistant Examiner—Howard Beltran
Attorney, Agent, or Firm—W. G. Fasse; D. F. Gould

[57] ABSTRACT

The present noise damping apparatus is especially intended for damping the noise caused by wheels running on rails. For this purpose there is provided a noise screen connected to at least one surface of the rail wheel in a force transmitting, yet removable manner. The noise screen comprises vibration damping reed members. This screen prevents noise generated by the wheel proper from radiating outwardly and it also acts as a noise absorber for the impact noise propagating in the wheel and other solid bodies.

10 Claims, 3 Drawing Figures

RAILWAY FLANGED WHEEL VIBRATION DAMPENING ASSEMBLY

BACKGROUND OF THE INVENTION

The present invention relates to an apparatus for damping the noise generated by a rail wheel such as a railroad wheel.

Vehicles traveling on rails cause noise in the track. Such noises are generated at the points where the wheels contact the rails. Such noises are mainly the result of a superposition of rolling vibrations, sliding contact noises and rotational vibrations. The noise generated in this manner is radiated on the one hand as sound traveling through the air from the rail and track system. On the other hand, vibrational noise components propagating in solids such as the wheels and rails are transmitted directly through the rails as well as through the wheels from the point where the noise is generated. Due to structural considerations, for example, of a railroad system, it is not possible to completely eliminate the generation of noise, especially in track sections forming a curve.

A flanged rail wheel is known which is noise dampened by means of a layer of synthetic material applied to the wheel disc. The layer of synthetic material reaches from the hub area over the wheel disc proper into the inner edge of the wheel rim. A wheel cover of sheet metal covering substantially the same area as the layer of synthetic material is secured on top of the layer of synthetic material. The wheel cover is held in position by the bonding or adhesive action of the synthetic material.

One disadvantage of this type of noise damping device is seen in that, once applied, the device cannot be removed from the wheel disc without being destroyed in the process. However, it is necessary to inspect the wheel disc from time to time for detecting any starting fatigue cracks and the like. For this purpose this type of prior art noise damping device must be removed and replaced by a new one after the inspection. On the other hand, the inspection could be performed only on one side of the rail wheel. However, that is not satisfactory for safety reasons. Furthermore, it has been found that the efficiency of damping masses which are directly applied to the vibrating body depends directly on the quantity of the applied damping material. Thus, substantial quantities of damping synthetic material must be applied to the wheel in accordance with the prior art in order to achieve the desired damping effect. Such substantial quantities, of course, increase the weight of the wheels, which is also undesirable.

OBJECTS OF THE INVENTION

In view of the above, it is the aim of the invention to achieve the following objects, singly or in combination:

to provide a damping device for rail wheels, especially railroad wheels which efficiently dampens the sound propagated through the air from the wheel, as well as the vibrations propagated through solids from the wheel, without substantially adding to the weight of each wheel;

to construct the damping device in such a manner that it will leave the rail wheel substantially unchanged;

to construct the damping device in such a manner that it may be easily removed and replaced, as well as reattached after the wheel has been inspected without substantially adding to the weight of the wheel;

to construct the damping device so that it will prevent the radiation of sound into the air from the wheel or from the wheel disc;

to construct the damping device in such a manner that it will act as a vibration absorber, especially for the noise generated inside the rail wheel, whereby the damping device is connected to the wheel in such a manner that the noise propagating in solids will be directly introduced into the noise damping device for absorption; and to construct the damping device in such a manner that it will simultaneously effectively prevent the propagation of sound from the wheel into the air while simultaneously absorbing the noise propagating in solids, namely, in the wheel itself to thereby prevent the transfer of noise into the rails.

SUMMARY OF THE INVENTION

According to the invention there is provided a sound dampening screen for rail wheels, for example, railroad wheels, for covering at least one side of the wheel disc, said screen comprising vibration damping horn members and means securing the screen in a force transmitting, however releasable manner to the rail wheel proper.

The sound damper according to the invention acts substantially in a twofold manner. On the one hand, the present device operates as a screen which prevents that the sound radiated from the wheel disc can be transmitted into the surrounding air. On the other hand, the present device also acts as a vibration absorber into which vibrations, propagating in solids is introduced, and wherein such vibrations are absorbed by the horn members.

In a preferred embodiment of the invention the vibration dampers or reed members are separated from the screen proper by radially extending separation gaps. This feature of the invention has the advantage that any tendency of the screen itself to produce vibrations is avoided and that the individual horn members cannot influence each other.

BRIEF FIGURE DESCRIPTION

In order that the invention may be clearly understood, it will now be described, by way of example, with reference to the accompanying drawings, wherein.

Figure 1:
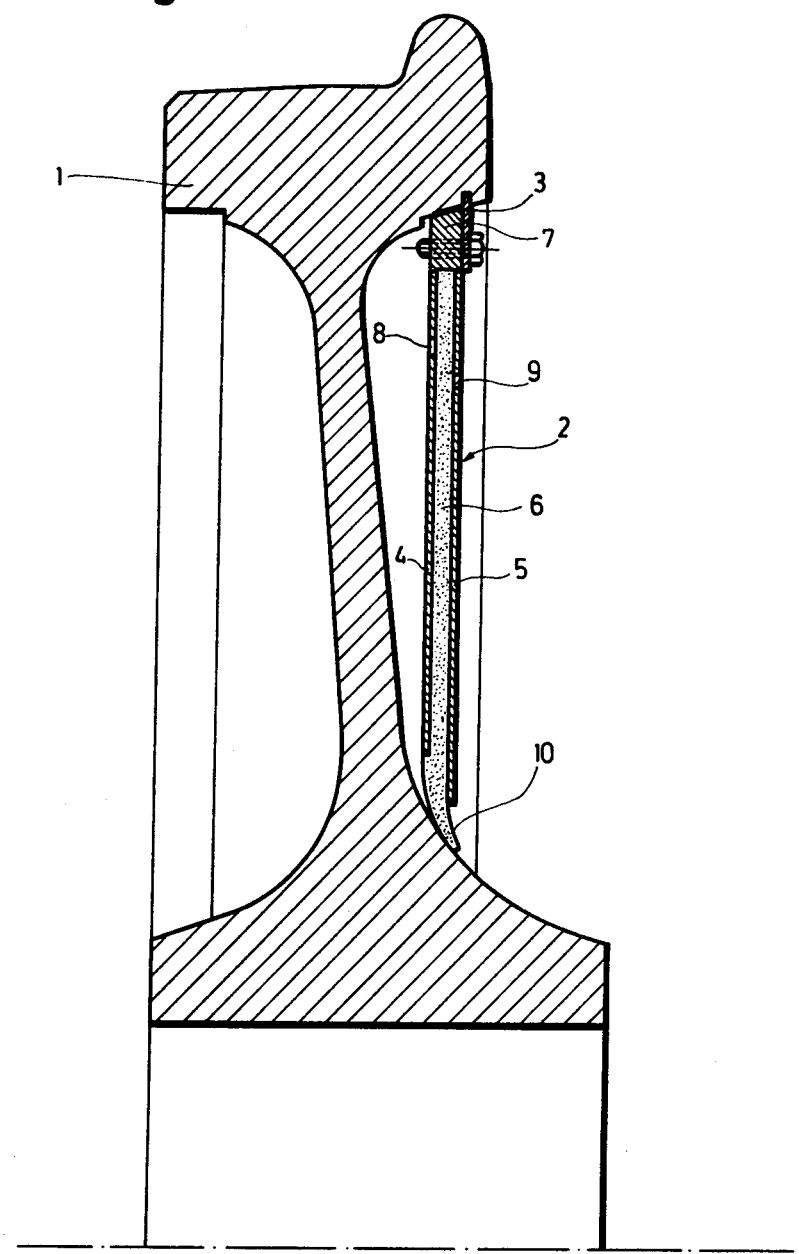
FIG. 1 is a radially extending sectional view through the upper half of a rail wheel equipped with a sound and vibration damping device according to the invention.
Figure 2:
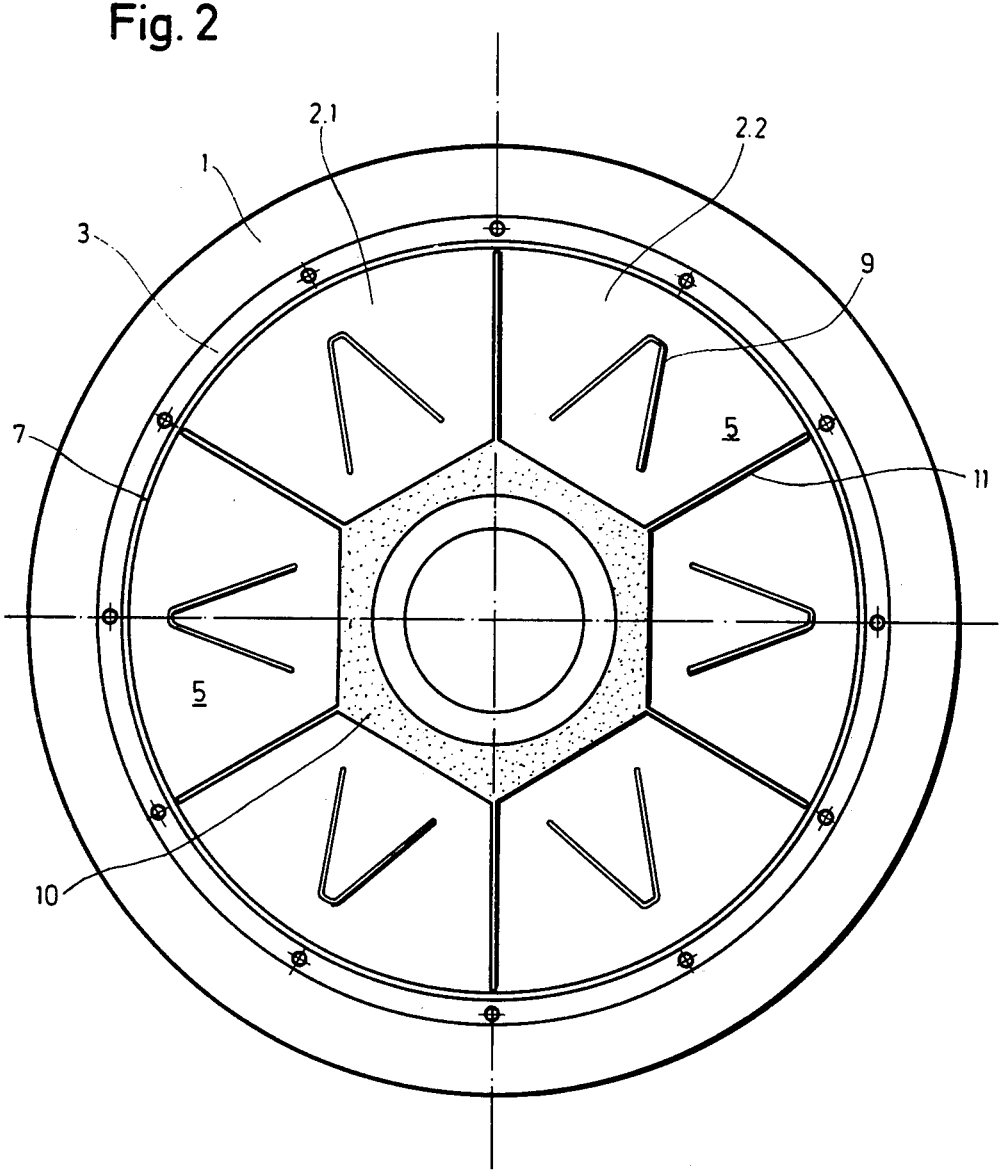
FIG. 2 is a top plan view of a rail wheel provided with a screen according to the invention which comprises two separable components, whereby the damping device is secured to the inside of the wheel as also shown in FIG. 1.

DETAILED DESCRIPTION OF PREFERRED EXAMPLE EMBODIMENTS:

FIG. 1 shows a sectional view through the upper half of a rail wheel 1 of conventional construction. A sound and vibration absorbing device according to the invention is secured to the inwardly facing surface of the rail wheel to cover the wheel disc proper. The outer circumference of the absorbing device or screen 2 is secured to the inner edge of the wheel rim by clamping means providing a force transmitting, but releasable connection. A connecting rim 7 to which the elements of the absorbing device are secured in a manner to be described below, fits into a groove in the inner edge of the wheel rim and a snap ring or tyre-clip retains the rim 7 in the groove of the wheel rim. The present device is constructed as a screen or umbrella 2, so to speak, comprising two walls 4 and 5 made of metal, preferably steel. The space between the walls 4 and 5 is filled with a damping material 6. The outer circumferential edges of the walls 4 and 5 are secured, for example by screws to the connecting rim 7 which interconnects the two walls 4 and 5 at their circumference and which serves for securing the damping device to the wheel rim proper, as mentioned above. The walls 4 and 5 are provided with slots 8 and 9 distributed about the surface of the screen or umbrella 2 as best seen in FIG. 2. The slots 8 and 9 are preferably staggered relative to each other and have a V-configuration to form vibration absorbing reed members. The damping mass 6 is, for example, a polyurethane plate pasted to the walls 4 and 5 and so best suited for the vibration absorbing. The damping mass 6 is sandwiched between the walls 4 and 5 in such a manner that a sealing lip 10 protrudes radially inwardly from the space between the two walls 4 and 5. This feature of the invention has the advantage that the space inside the screen 2 cannot be contaminated and, even more important, that sound is prevented from exiting at this point from the space behind the screen.

FIG. 2 shows a top plan view onto the inside of the rail wheel illustrated in FIG. 1. The screen 2 covers the wheel disc completely. To facilitate the mounting of the screen 2 to the wheel rim, the screen 2 is constructed according to the invention in a separable manner. Thus, the screen has two semicircular segments 2.1 and 2.2, each segment has a centrally located semicircular recess or opening for passage of the wheel axle. The above mentioned tyre-clip 3 secures both halves of the screen 2.1 and 2.2 to the wheel rim 1. For example, the tyre-clip 3 may be screwed to the securing element 7 by means of screws 21. Each semicircular damper segment is divided into a plurality of sectors 22 by slots 11 extending substantially radially in the walls 4 and 5 to form individual absorbers, each of which in turn is provided with a reed element 23 by means of V-shaped slots 9 in the wall 5 which forms in combination with the damping material connected to the wall 5, a vibration absorber which absorbs the noise propagating directly from the connecting rim 7 into the vibration absorber. As mentioned, the slots 11 separate adjacent vibration absorbers from each other.

In the light of the above disclosure it will be appreciated, that a screen identical to the screen 2 could be attached to the outwardly facing side of the wheel disc. However, it has been found, that an arrangement of a sound and noise damper on one side only as illustrated results already in a reduction of the noise level by 13 dB (A). In addition, a single damper for each wheel reduces the reverberation time by about 10% as compared to the reverberation time of a wheel not equipped with a damper according to the invention. These advantages have been achieved, according to the invention, without any substantial increase in the weight of each individual wheel since it has been found that the weight increase is only about 4% as compared to the weight of a wheel not equipped with the damper according to the invention.

The attachment of a sound and vibration damper according to the invention to a rail wheel is not limited to the illustrated type of securing. Thus, the damper could be secured to the wheel, for example, by adhesives, by welding, and other type of screws, for example, wing nuts or the like. It is merely necessary, that a force transmitting connection is accomplished to assure that vibrations propagating in solids are directly introduced into the vibration damper.

Figure 3:
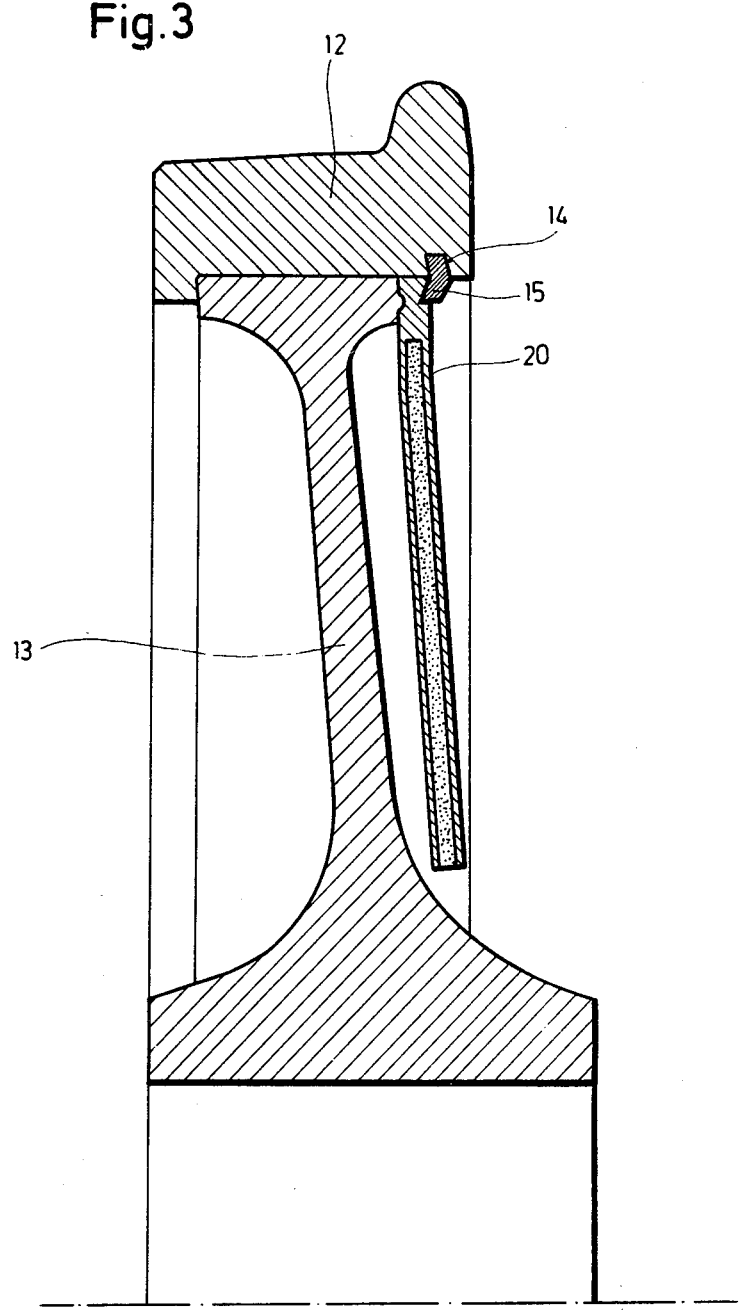
FIG. 3 shows a sectional view similar to that of FIG. 1, but illustrating a modified version of the noise damping device according to the invention.

FIG. 3 illustrates as especially advantageous embodiment of the invention which is a modification of the embodiment of FIGS. 1 and 2. The screen 20 is constructed similarly to the screen 2, however, without a protruding lip 10. The wheel structure of FIG. 3 comprises a wheel disc 13 having secured thereto a wheel rim 12, for example, by means of a shrink fit. The screen 20 is secured to the wheel by means of a clamping ring 15 fitting partially into a groove 14 in the inner edge of the wheel rim 12. The clamping ring 15 has such a shape that it presses the circumferential edge of the screen 20 against the circumferential rim of the wheel disc 13. The assembly is accomplished in such a manner that after the shrinking fit of the rim 12 onto the disc 13, a screen 20 is simply placed to rest on the circumferential rim of the disc 13, whereupon a clamping ring 15 is rolled into the groove 14 of the rim 12. Thus, the clamping ring 15 performs simultaneously two functions, namely, to secure the disc 13 and the screen 20 to the rim 12.

By filling the space between the screen walls 4 and 5 in both illustrated embodiments with a vibrations absorbing mass such as a polyurethane plate, and by securing the circumferential rim of the screen 2, 20 in a force transmitting manner to the wheel, the advantage is achieved that vibrations propagating in the body of the wheel are directly absorbed and that radiated sound or noise is substantially dampened, especially where the V-shaped slots are employed to form reed members as described. This combination of an effective and substantial elimination of sound propagation with the absorbtion of body vibrations is considered to be a substantial advance in the art. The efficiency of the device is even increased by the above mentioned sealing lip 10 directly contacting the wheel hub.

Furthermore, the assembly and disassembly is rather economical, especially in the second embodiment wherein the wheel rim 12 is secured to the wheel disc 13 by a shrink fit which is further secured by the clamping ring 15 which may easily be removed when it is necessary to inspect the wheel.

Although the invention has been described with reference to specific example embodiments, it will be appreciated, that it is intended, to cover all modifications and equivalents within the scope of the appended claims.

What is claimed is:

1. An apparatus for damping noise on a rail wheel, comprising damping disk means including a plurality of vibration absorbing plate elements, means securing said damping disk means to at least one side of said rail wheel in a force transmitting manner, and slot means dividing said damping disk means into said plurality of vibration absorbing plate elements.

2. The apparatus of claim 1, wherein said vibration absorbing plate elements are substantially sector shaped, and wherein said slot means extend substantially radially between adjacent sectors.

3. The apparatus of claim 1, wherein said damping disk means comprise two semicircular sections divided into several sections by said slot means, each section having a centrally located recess for the axle or hub of the wheel.

4. The apparatus of claim 1, wherein said damping disk means comprise two substantially parallel wall members extending in spaced relationship to each other, with resilient means sandwiched between said wall members to absorb vibrations, said wall members being divided by said slot means into sections.

5. The apparatus of claim 4, wherein said absorbing means sandwiched between said wall members comprise a radially inwardly reaching extension lip.

6. The apparatus of claim 4, further comprising V-shaped gaps in said wall members, whereby the V-shaped gaps in one wall member are spaced relative to the respective V-shaped gaps in the other wall member.

7. The apparatus of claim 1, wherein said vibration absorbing plate elements further incorporate substantially V-shaped gaps the tips of which point radially outwardly.

8. The apparatus of claim 1, wherein said securing means comprise a recess in said rail wheel, a holding ring element fitting into said recess, and means securing said holding ring to said vibration absorbing plate elements of said damping disk means.

9. The apparatus of claim 1, wherein said securing means comprise recess means in said rail wheel and clamping ring means securely held in said recess means, said clamping ring means pressing said vibration absorbing plate elements of said damping disk means in a force transmitting manner against the rail wheel.

10. The apparatus of claim 1, wherein said securing means are removably secured to the rail wheel.

* * * * *